Oct. 22, 1929.  L. B. FOWLER ET AL  1,732,838
TRACTOR HITCH FOR LOGGING CARTS
Filed April 9, 1927
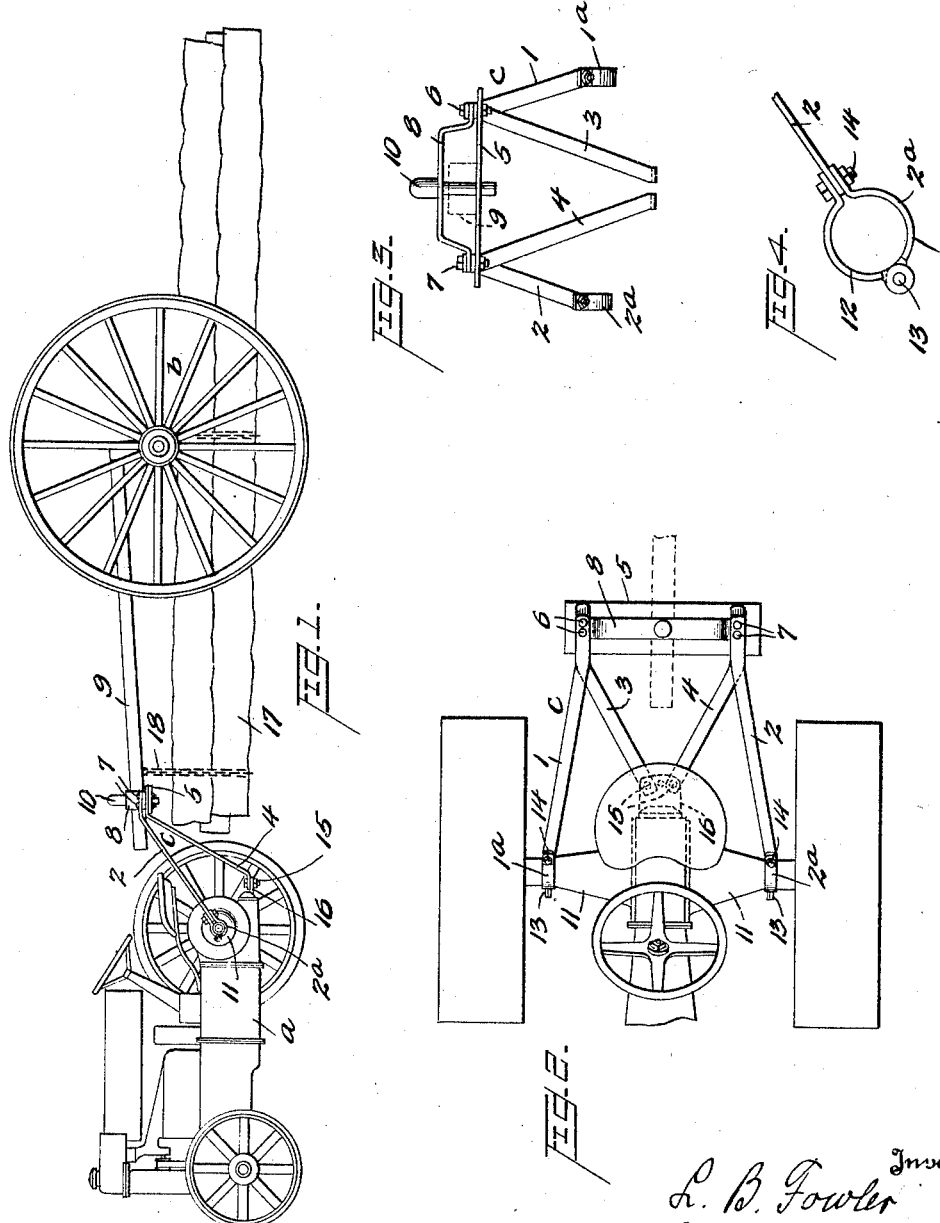
Inventor
L. B. Fowler
E. K. Allen
By
Robert S Watson
Attorney Patented Oct. 22, 1929

1,732,838

UNITED STATES PATENT OFFICE

LONNIE B. FOWLER AND ELLIE K. ALLEN, OF CREEDMORE, NORTH CAROLINA

TRACTOR HITCH FOR LOGGING CARTS

Application filed April 9, 1927. Serial No. 182,348.

This invention relates to a hitch attachment for connecting logging carts to the well known Fordson type tractor. The hitch of our invention comprises two pairs of bars which project upwardly and rearwardly from the rear axle housing of the tractor, and are connected at their rear ends to a cross-piece having coupling devices for receiving the beam of the logging cart. Two of these bars are secured to opposite ends of the axle housing and converge toward said cross-piece, while the other two bars are secured to the central part of the axle housing and diverge toward the cross-piece. The cross-piece is thus diagonally braced from the axle housing so as to resist the severe side thrusts which are sometimes applied to the attachment by the beam of the logging cart. The form of the attachment is such as to provide clearance for the ends of the logs, which may project beneath the cross-piece, this clearance being desirable in order to permit the tractor to be turned at sharp angles to the beam, without interfering with the logs.

In the accompanying drawing,

Fig. 1 is a side elevation of a tractor and logging cart, connected by our improved hitch, one of the rear wheels of the tractor being omitted;

Fig. 2 is a top plan view of the rear portion of the tractor with the hitch applied thereto;

Fig. 3 is a rear elevation of the hitch; and,

Fig. 4 is a detail view of one of the clamps for securing the side bars to the housing of the tractor.

Referring to the drawing, $a$ represents a tractor of the well known Fordson type, $b$ indicates a logging cart, and $c$ indicates our improved hitch, which connects the tractor with the beam of the cart.

The hitch comprises metal rods or bars 1, 2, 3, and 4, which are secured at their rear ends to the cross-piece 5. As shown, the bars 1 and 3 are secured at one end of the cross-piece by bolts 6, and the bars 2 and 4 are secured to the opposite end of the cross-piece by bolts 7. These bolts also pass through the ends of a metal band 8, which is arched above the cross-piece to form a retaining loop or clevis for the beam 9 of the cart. The band and the cross-piece are provided with alined holes for receiving a coupling pin 10. The bars are all bent adjacent the cross-piece so as to incline downwardly therefrom when the cross-piece is held in a horizontal plane, and the bars 1 and 2 diverge while the bars 3 and 4 converge from the ends of the cross-piece. The bars 1 and 2 are provided with clamping rings 1ª and 2ª at their forward ends, adapted to encircle the axle housing 11 of the tractor. Each clamping ring consists of two similar parts 12, hinged together, as shown at 13, and a bolt 14 serves to tighten the two parts around the housing and to secure the ring to the bar. The forward ends of the bars 3 and 4 are perforated to receive bolts 15, by which they may be connected to a coupling piece 16, forming part of the tractor, and which is provided on the central part of its rear axle housing for receiving the draw bar of a trailer.

In applying the attachment to a tractor, the clamping rings 1ª and 2ª are clamped around the axle housing near the wheels, and the forward ends of the bars 3 and 4 are bolted to the coupling 16 on the tractor. The bars then support the cross-piece in a position at the rear of the tractor wheels, and considerably above the rear axle of the tractor, as shown in Figs. 1 and 2. In this position, the beam of the tractor may readily be inserted through the loop formed by the band 8 and the cross-piece and the forward ends of the logs 17, which are supported by a chain 18 from the forward end of the beam, may extend under the cross-piece of the attachment.

It is to be noted that the bars 1 and 2, which converge from the ends of the axle housing toward the cross-piece 5, and the bars 3 and 4, which diverge from the central part of the axle housing toward the ends of the cross-piece, form a trussed structure which enables the attachment to withstand the severe lateral stresses which are applied to it when the tractor is pulling at an angle to the line of the cart beam, or when the cart wheels fall into ruts or pass over obstructions on the roads which tend to swing the beam and the logs out of line with the tractor. Also, it is to be noted that the ends of the logs may swing under the cross-piece without interfering with the attachment, either when the tractor is pulling straight ahead, or when the tractor is turned at sharp angles to the line of the beam and the logs. Because of the trussed arrangement, the attachment may be made relatively light in weight, and it is to be noted that the attachment can be applied to the tractor without making any changes in the latter, and that it can be removed, so that the tractor may be used for other purposes, by simply taking out the bolts which secure the bars to the tractor.

What we claim is:

The combination with a tractor having a rear axle housing and having a drawbar attaching device at the central part of the housing, of a hitch for logging carts comprising a pair of rods secured to the end portions of the axle and extending upwardly and rearwardly therefrom, said rods converging toward their rear ends, a cross-piece to which said rear ends are connected, and a pair of rods secured to said attaching device and extending upwardly and rearwardly therefrom, said latter rods diverging toward their rear ends and having their rear ends attached to the cross-piece, and means on the cross-piece for connecting the same to the beam of a logging cart.

In testimony whereof we hereunto affix our signatures.

LONNIE B. FOWLER.
ELLIE K. ALLEN.